United States Patent [19]
Gross et al.

[11] Patent Number: 5,582,779
[45] Date of Patent: Dec. 10, 1996

[54] PROCESS AND APPARATUS USING LIQUEFIED GAS FOR MAKING PLASTIC PARTICLES

[75] Inventors: Gerhard Gross, Willich; Birgitta Meier, Moers; Johannes Vetter, Dresden; Peter Steinau, Mainz, all of Germany

[73] Assignee: Messer Griesheim GmbH

[21] Appl. No.: 259,993

[22] Filed: Jun. 15, 1994

[30] Foreign Application Priority Data

Jun. 17, 1993 [DE] Germany .................. 43 19 990.9

[51] Int. Cl.⁶ .................................................... B29B 9/10
[52] U.S. Cl. ............................ 264/11; 425/7; 264/41
[58] Field of Search .................... 264/11, 12, 5, 264/8, 13, 14, 41; 425/7, 6, 8

[56] References Cited

U.S. PATENT DOCUMENTS

| | | | |
|---|---|---|---|
| 3,901,675 | 8/1975 | Buchanan et al. | 264/12 |
| 4,013,744 | 3/1977 | Kuerten et al. | 264/11 |
| 4,052,183 | 10/1977 | Levecque et al. | 264/12 |
| 4,472,329 | 9/1984 | Muschelknautz et al. | 264/12 |
| 4,642,262 | 2/1987 | Piotrowski et al. | 264/12 |
| 4,792,289 | 12/1988 | Nieratschker | 417/259 |
| 5,196,049 | 3/1993 | Coombs et al. | 75/338 |
| 5,260,003 | 11/1993 | Nyssen et al. | 264/6 |
| 5,296,286 | 3/1994 | Allen et al. | 264/12 |
| 5,322,650 | 6/1994 | Endo et al. | 264/11 |

*Primary Examiner*—Robert A. Dawson
*Assistant Examiner*—Kenneth M. Jones
*Attorney, Agent, or Firm*—Connolly & Hutz

[57] ABSTRACT

The invention relates to a process for the solvent-free and dry production of particles from plastics. According to the invention, the plastic is heated to form a viscous material, in this form, is conveyed as material stream through an outlet into a comminution device and there, with spraying of a pressurized liquid atomization medium against it, is comminuted into fibrids and/or fine particles.

21 Claims, 1 Drawing Sheet

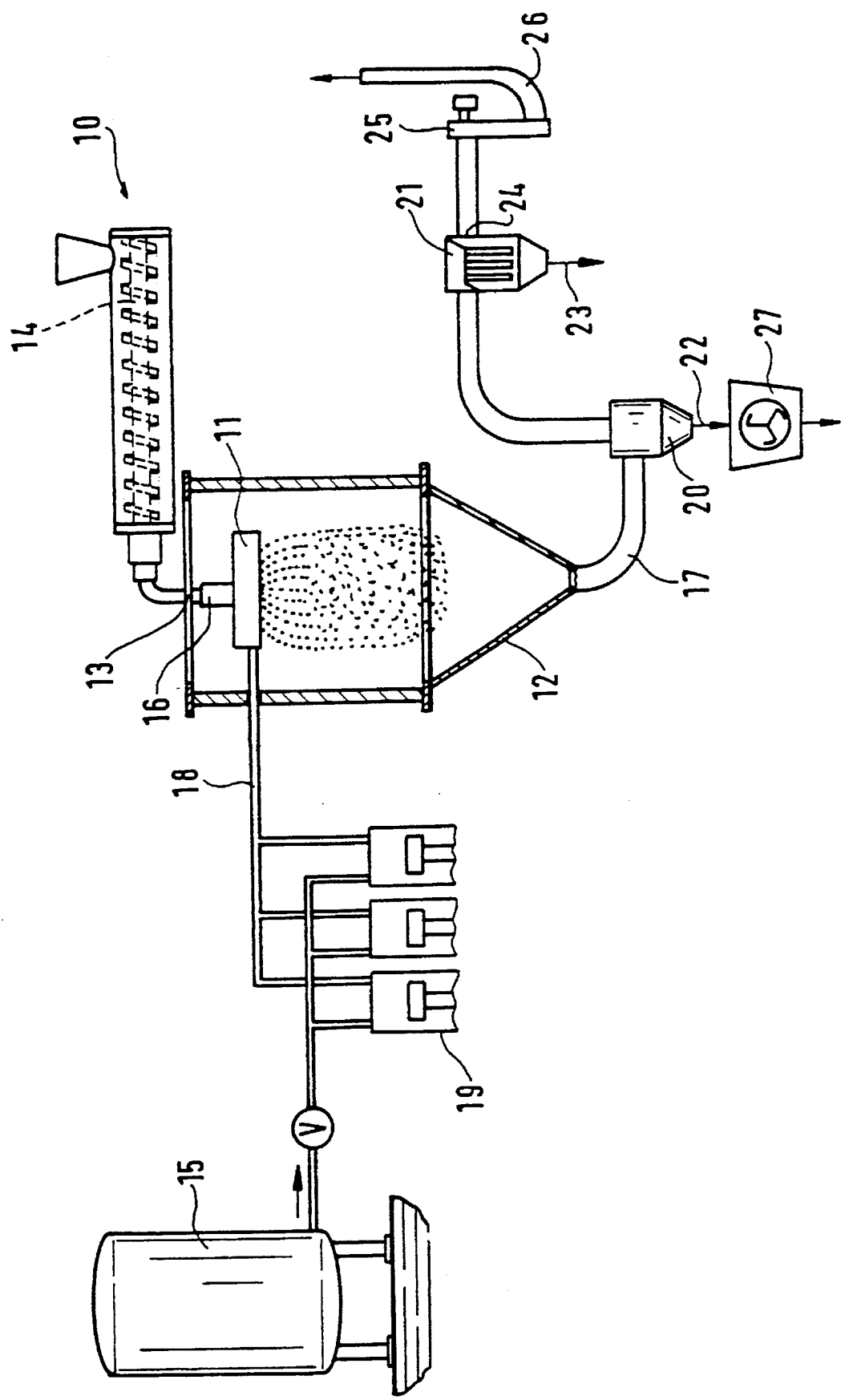

PROCESS AND APPARATUS USING LIQUEFIED GAS FOR MAKING PLASTIC PARTICLES

BACKGROUND OF THE INVENTION

The invention relates to a process for producing particles from plastics.

A multiplicity of applications use plastic particles in the form of fibers (fibrids) or free-flowing particles (powders), for example fibrids in the production of special papers (tea bags) or as asbestos substitute in fibrated concrete and plastic powders in coatings and in dispersions.

Fibrids are understood to mean artificially produced short, fine plastic fibers with a length of between 0.5 and 6 mm and a diameter of approximately 1 to 10 µm.

A production of fibrids has become known in which the plastic in alcoholic solution is emulsified with water and injected under high pressure into an evacuated chamber. By this means, the alcohol evaporates suddenly and tears the liquid jet apart, short fibers being produced which are subsequently separated by drying from the water surrounding them.

A solvent-free and dry production process for plastic particles is desirable, however, because by this means the production effort can be considerably reduced.

SUMMARY OF INVENTION

The object of the invention is therefore to provide a process and a device for the production of plastic particles which is more economical than the known process and reduces or entirely eliminates the disadvantages of the latter.

The invention starts from the concept of heating plastics to form a viscous material and comminuting them with an atomization medium impinging under pressure. It has been found, surprisingly, that with a corresponding kinetic impingement energy, depending on the plastic used and the atomization medium, of the atomization medium on the viscous material of the plastic, fibrids and fine particles are produced. In this case, it has proven especially advantageous to spray a gas liquefied at low temperature, in particular nitrogen liquefied at low temperature, against the viscous material, because the impingement energy on the viscous material of the plastic can be further increased as a result of the higher density, so that the viscous material stream of plastic is torn apart into small particles as a result of the high impulse of the liquid nitrogen and the expansion of the evaporating liquid nitrogen. In addition, the plastic in the molten state is protected by the nitrogen liquefied at low temperature against contact with oxygen and thus against oxidation and, as a result of the low temperatures of the liquid nitrogen, the particles or fibrids produced solidify immediately and do not stick together again.

The evaporating nitrogen is subsequently cleaned of entrained plastic particles and led into the open or to a collection vessel for further use.

Atomization of the plastic in the molten state with gases such as air, nitrogen or argon, or else with water, leads to greater lengths and diameters of the fibrids or particles.

In the drawing, 10 indicates a melting device, 11 indicates a spray device and 12 indicates an atomization tower assigned to the spray device 11 and to the melting device 10.

In the melting device 10, a plastic is heated to a temperature which has to be as high as possible to establish a low viscosity but significantly below the respective decomposition temperature, to form a viscous material (for example low density polyethylene [LDPE] to approximately 280° C.) and passes as viscous material stream with emergence rates of between 20 and 200 g/s, preferably 50 to 150 g/s, through an outlet 13 with a total free cross-section of between 0.5 and 10 mm, into the atomization tower 12. The uncrosslinked plastic (thermoplastic), preferably from the group comprising polyolefines (polypropylene and polyethylene) is in this case preferably melted in an extruder and conveyed by means of the screw 14 to the outlet 13. Two kinds of extruders, in principle, come into consideration for the preparation of the melt, a continuously operating extruder (possibly with downstream viscose pump) with a throughput which is constant over time, or an extruder which can output a significantly larger amount intermittently in a shorter time. The pressure with which the plastic is sprayed out of the outlet 13 is in this case applied either by means of the screw 14 or hydraulically by means of a ram or pneumatically by means of a gas cushion on the viscous material of the plastic. The outlet 13 may consist either of a single round or otherwise shaped (for example slot) opening or of an arrangement of a plurality of openings. The total cross section of the outlet 13 and the pressure acting here determine the rate at which the plastic enters the atomization tower 12. A predispersion of viscous material of the plastic is achieved by the addition of gaseous, chemical or low-boiling liquid blowing agents (foaming agents) or other additives and by the mixing of incompatible plastics, that is to say plastics which do not wet one another, in various volume ratios and mixtures in the melting device 10, so that the viscous material flow emerging from the outlet 13 passes already in the form of small or extremely small droplets into the region of the spray device 11. The latter has an annular nozzle, perforated nozzle and/or a plurality of consentially nozzle, individual nozzle with rigidly predetermined, but variably adjustable setting angles and/or multi-stage nozzles arranged at different levels.

By varying the nozzle parameters such as setting angle, emergence cross-section and nozzle diameter, and also the pressure range and ratio of liquid gas amount/plastic amount, both the fibrids/particle shape (round to elongate) and the grain-size distribution can be selectively adjusted. The nozzle parameters are adapted to the atomization media of gas or gas liquefied at low temperature or liquid and to the plastic used, taking into account the desired dimensions of the fibrids or particles. When an annular nozzle is used, the gas liquefied at low temperature may emerge without or with swirl as a result of which an improvement of the spraying is achieved.

The spraying device 11 is connected, via the insulated pipe line 18, if appropriate with the interposition of a liquid nitrogen-operated supercooler and a pump 19, directly to an insulated reservoir 15. From the latter, the low-boiling liquefied gas is fed to the spraying device 11 and inert gas, for example nitrogen, argon, or helium liquefied at low temperature is sprayed at a pressure of between 5 and 600 bar, preferably between 50 and 300 bar, against the viscous material stream 16.

By the use of an inert gas liquefied at low temperature, a contact of the viscous material stream with oxygen is avoided and the plastic is thus protected against oxidation. By the low temperatures of the inert gas liquefied at low temperature, the particles or fibrids solidify immediately and fall to the bottom of the atomization tower 12. A cyclone 20 and a filter 21 are connected to the atomization tower via a line 17.

The plastic particles or plastic fibrids respectively are removed from the cyclone 20 and the filter 21 via lines 22 and 23 respectively.

The discharge 24 of the filter 21 is connected to an exhaust-air stack 26, with the interposition of a suction fan 25.

Specific plastic grades are advantageously post-comminuted mechanically in granulators 27 directly after atomization. The energy input to be provided for this is small, since the material is at low temperature after atomization with liquid nitrogen and is therefore brittle and is already in the form of thin fibers.

Experiments with a low density polyethylene produced fibrids with an average diameter of approximately 9 τm and a length of some mm. The outlet 13 from the melting device 10 was circular with a diameter of 4 mm. The viscous material of the plastic was conveyed pneumatically by means of a nitrogen ($N_2$) gas cushion, by a pressure of 3 bar absolute, into the atomization chamber. The atomization was carried out with nitrogen liquefied at low temperature which emerged at a pressure of 200 bar from a system of six individual nozzles.

Experiments with a polypropylene provided thinner but somewhat longer fibers.

We claim:

1. A process for producing particles from plastic material, comprising feeding a pressurized cryogenic liquefied gas to a spray device, heating the plastic material to form a viscous material, conveying the plastic in viscous form as a material stream through an outlet into the spray device, spraying the pressurized cryogenic liquefied gas against the plastic material while in the spray device, comminuting the plastic material into fibrids and/or fine particles as a result of the liquefied gas contacting the material stream, the atomization medium impinging on the viscous material stream with a pressure of between 5 and 600 bar, the atomization medium being nitrogen which is liquefied at low temperature and brought to a pressure of between 10 and 300 bar, and is sprayed through a nozzle assembly onto the viscous material stream, the plastic being a thermoplastic, bringing the viscous material stream which emerges from the outlet to values of between 20 and 200 grams per second, adding a blowing agent to the material stream, and adding an incompatible plastic to the material stream.

2. A process for producing particles from plastic material, comprising heating the plastic material to form a viscous material, conveying the viscous material as a material stream through an outlet into a spray device, spraying the material stream while the material stream is in the spray device with a pressurized gaseous atomization medium which is sprayed in liquid form against the material stream, causing the plastic material of the material stream to be comminuted into particles of fibrid and/or fine particle form as a result of the atomization medium contacting the material stream; and the atomization medium being a gas liquefied at low temperature.

3. The process as claimed in claim 2 wherein the atomization medium is an inert gas.

4. The process as claimed in claim 4 wherein the inert gas is nitrogen.

5. The process as claimed in claim 2, wherein the atomization medium impinges on the viscous material stream with a pressure of between 5 and 600 bar.

6. The process as claimed in claim 5 wherein the pressure is between 50 and 300 bar.

7. The process as claimed in claim 5, wherein the atomization medium is nitrogen which is liquefied at low temperature and, brought to a pressure of between 10 and 300 bar, is sprayed through a nozzle assembly onto the viscous material stream.

8. The process as claimed in claim 7, wherein the plastic is a thermoplastic.

9. The process as claimed in claim 8 wherein the thermoplastic is selected from the group comprising polyolefines.

10. The process as claimed in claim 8, wherein the viscous material stream which emerges from the outlet, is brought to values of between 20 and 200 grams per second through the outlet and is sprayed in particles.

11. The process as claimed in claim 10 wherein the material stream is brought to values of between 50 and 150 grams per second.

12. The process as claimed in claim 10, wherein a blowing agent is added to the material stream.

13. The method process as claimed in claim 12, wherein the particles are post-comminuted in a granulator.

14. A process for producing particles from plastics, comprising heating the plastic to form a viscous material, conveying the viscous material as a material stream through an outlet into a spray device, spraying a pressurized cryogenic liquid atomization medium while in liquid form against the material stream in the spray device, comminuting the plastic material of the material stream into fibrids and/or fine particles as a result of the atomization medium contacting the material stream, and supplying the cryogenic liquid atomization medium from an insulated reservoir.

15. The process as claimed in claim 14 wherein the atomization medium is water.

16. A device for producing particles of plastic comprising a melting and conveying device for heating plastic material to a viscous form into a material stream, said melting and conveying device having an outlet in flow communication with a spray device for directing the material stream into said spray device, said spray device being mounted in flow communication with an atomization tower, an insulated reservoir containing a supply of cryogenic atomization medium in the form of pressurized liquefied gas which is liquefied at low temperature, means for conveying said atomization medium from said reservoir to said spray device through an insulated line between said reservoir and said spray device, said atomization medium causing comminution of said plastic material into particles of fibrid and/or fine particles as a result of said atomization medium contacting said material stream while in said spray device, and said spray device having an outlet directed to said atomization tower for discharge of said particles into said atomization tower.

17. The device as claimed in claim 16 wherein said means for conveying said atomization medium includes a pump, said atomization medium being nitrogen, and said spray device outlet being a plurality of nozzles.

18. The device as claimed in claim 17 wherein a pump is connected to the insulated line.

19. The device as claimed in claim 17, wherein a flow line connects a cyclone and a filter to the atomization tower.

20. The device as claimed in claim 19, wherein the filter is connected to an exhaust-air stack for discharging exhaust gas a suction fan being between the filter and the exhaust-air stack.

21. The device as claimed in claim 20, wherein the cyclone to the granulator for post-comminution.

* * * * *